(12) United States Patent
Norton et al.

(10) Patent No.: US 8,918,253 B2
(45) Date of Patent: Dec. 23, 2014

(54) RIDE PERFORMANCE OPTIMIZATION IN AN ACTIVE SUSPENSION SYSTEM

(75) Inventors: Russ Lee Norton, Brownstown Township, MI (US); Benjamin Bulat, Plymouth, MI (US); Greg Gregory Suter, Farmington Hills, MI (US); Albert Chenouda Salib, Troy, MI (US); David Michael Russell, Ann Arbor, MI (US); Uwe Hoffmann, Leverkusen (DE); Marc Suermann, Duisburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/531,997

(22) Filed: Jun. 25, 2012

(65) Prior Publication Data

US 2013/0345933 A1    Dec. 26, 2013

(51) Int. Cl.
| | | |
|---|---|---|
| *B60G 17/018* | (2006.01) | |
| *B60G 17/06* | (2006.01) | |
| *B60G 17/08* | (2006.01) | |
| *B60G 17/0165* | (2006.01) | |
| *B60W 40/10* | (2012.01) | |
| *B60G 17/015* | (2006.01) | |

(52) U.S. Cl.
USPC .......................................................... 701/37

(58) Field of Classification Search
CPC .... B60G 17/08; B60G 17/081; B60G 17/019; B60G 17/019; F16F 9/44; F16F 9/512
USPC ................. 701/37, 38; 280/5.514, 5.515; 188/266.1; 267/140.14
See application file for complete search history.

(56) References Cited

U.S. PATENT DOCUMENTS

| | | | | |
|---|---|---|---|---|
| 4,804,203 | A | * | 2/1989 | Glab et al. ................. 280/5.514 |
| 4,838,574 | A | * | 6/1989 | Baraszu ..................... 280/5.515 |
| 5,162,996 | A | * | 11/1992 | Matsumoto et al. ............ 701/37 |
| 5,429,384 | A | | 7/1995 | Takahashi et al. ............ 280/707 |
| 5,781,873 | A | * | 7/1998 | Sasaki .............................. 701/37 |
| 5,979,885 | A | * | 11/1999 | Katsuda ................... 267/140.14 |
| 2006/0243548 | A1 | * | 11/2006 | Stein et al. ................. 188/266.1 |
| 2008/0319609 | A1 | * | 12/2008 | Poilbout ........................... 701/38 |
| 2009/0062983 | A1 | * | 3/2009 | Knoll et al. ..................... 701/37 |
| 2009/0319123 | A1 | * | 12/2009 | Nardi et al. ..................... 701/37 |

FOREIGN PATENT DOCUMENTS

JP              4169316          6/1992

* cited by examiner

*Primary Examiner* — Tuan C. To
*Assistant Examiner* — Yuri Kan
(74) *Attorney, Agent, or Firm* — Jones Robb PLLC; Raymond L. Coppiellie

(57) ABSTRACT

An active vehicle suspension system includes an active damping mechanism operatively coupled to a vehicle wheel and configured for controlling a damping force applied to the wheel responsive to a control signal. A controller is operatively coupled to the damping mechanism and configured for generating a control signal to the damping mechanism responsive to velocity of the wheel in a downward vertical direction.

50 Claims, 3 Drawing Sheets

RIDE PERFORMANCE OPTIMIZATION IN AN ACTIVE SUSPENSION SYSTEM

BACKGROUND OF THE INVENTION

The embodiments of the present invention relate to active vehicle suspension systems incorporating continuously variable or multistep suspension dampers, and to methods for controlling such systems.

Vehicles may incorporate active or adaptive suspension systems to actively control the vertical movements of the vehicle wheels rather than allowing such movements to be determined entirely by interactions with the road surface. In order to maximize ride comfort in such vehicles, it is usually desirable to maintain the damping levels in vehicle shock absorbers at a relatively low value.

However, when a vehicle wheel encounters a depression (such as a pothole) in the road surface, a lower damping level permits the wheel to fall relatively rapidly into the pothole. Generally, the deeper the wheel falls into the hole, the greater the impact forces generated by the wheel impacting a far side of the hole just prior to rising out of the hole. With the wheel damping level at a relatively low value, these impact forces are transmitted through the vehicle suspension to the remainder of the vehicle, adversely affecting ride quality.

While increasing the level of wheel damping would reduce the impact forces transmitted to the vehicle and suspension, this would adversely affect ride quality when the vehicle is traveling on a normal, level road surface. Thus, it is desirable to increase damping levels only when a pothole is encountered, while maintaining the damping levels at the relatively lower value when the wheel is riding on a level road surface.

SUMMARY OF THE INVENTION

In one aspect of the embodiments of the present invention, an active vehicle suspension system is provided including an active damping mechanism operatively coupled to a vehicle wheel and configured for controlling a damping force applied to the wheel responsive to a control signal. A controller is operatively coupled to the damping mechanism and configured for generating a control signal to the damping mechanism responsive to a velocity of the wheel in a downward vertical direction.

In another aspect of the embodiments of the present invention, a method is provided for controlling a damping level applied to a wheel in an active suspension system. The method includes the steps of determining a velocity defined as a rate of change of a vertical position of the wheel over a first predetermined time period; comparing the velocity to a velocity threshold; and where the velocity is greater than the velocity-threshold, increasing the damping level.

In another aspect of the embodiments of the present invention, a method is provided for applying a damping force to a wheel moving in a downward vertical direction. The method includes the steps of measuring a time during which the wheel moves in the direction; measuring a velocity of the wheel in the direction; comparing the time to a threshold and the velocity to another threshold; and where the time does not exceed the threshold and the velocity exceeds the other threshold, applying a maximum available damping force to the wheel.

DETAILED DESCRIPTION

Figure 1:
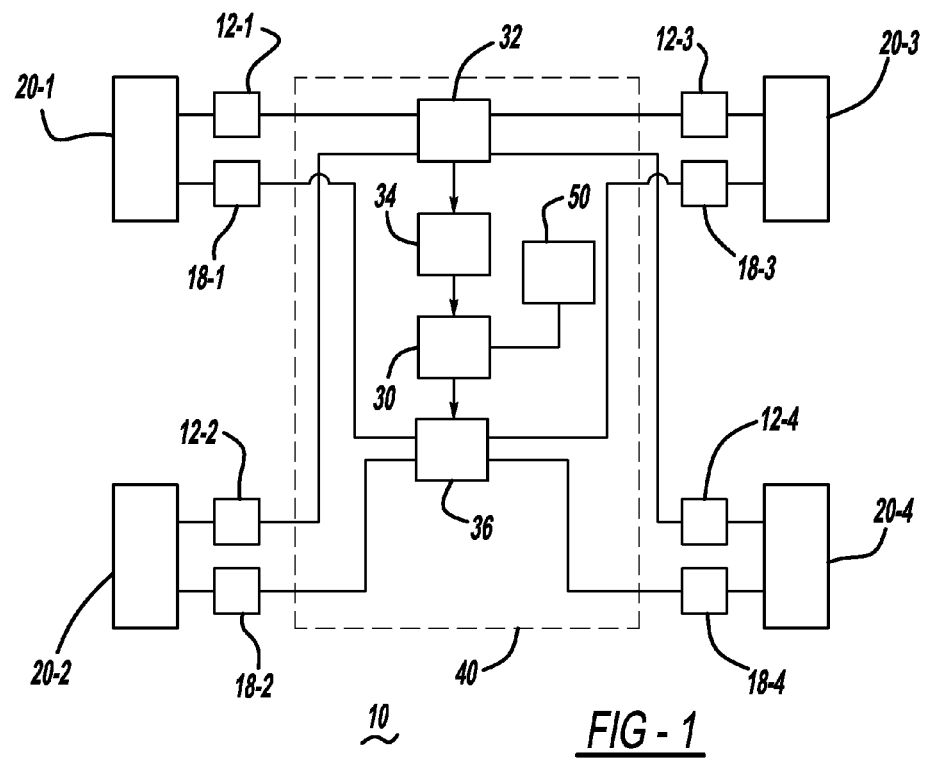
FIG. 1 is a schematic diagram of a portion of an active vehicle suspension system suitable for implementing a damping force control routine in accordance with an embodiment of the present invention.

FIG. 1 shows a schematic representation of a portion of one embodiment of an active vehicle suspension system (generally designated 10) configured for controlling damping forces provided by damping mechanisms (for example, shock absorbers) of the vehicle suspension. The active vehicle suspension system includes such active damping mechanisms operatively coupled to associated wheels of the vehicle. These damping mechanisms are configured for controlling a damping force applied to the wheel responsive to control signals generated by a computer processor. The computer may be incorporated into a suspension system controller 40 forming part of an overall vehicle system control system (not shown).

The active suspension system 10 incorporates an embodiment of a damping level control routine as described herein, which is usable for controlling the damping forces responsive to an interaction between a vehicle wheel supported by the damping element and a depression in a road surface on which the wheel is rolling. Spring elements and various other elements of a conventional active vehicle suspension system may also be incorporated in system 10, but are not shown in FIG. 1.

In the embodiment shown in FIG. 1, suspension system 10 includes wheel position sensors 12 (indicated by 12-1, 12-2, 12-3, and 12-4) operatively coupled to a corresponding one of each of vehicle wheels 20-1, 20-2, 20-3, 20-4 and also to controller 40. Sensor(s) 12 are configured for detecting the vertical position of the corresponding vehicle wheel (i.e., the component of the wheel motion along a vertical or "y"-axis 333 extending through the wheel center) and with respect to a reference location in relation to which the wheel is movable. In one embodiment, the reference location is a location on a chassis 22 of the vehicle. In one embodiment, signals representative of wheel position y are continuously received from sensors 12 by a microcomputer 30 for processing in a manner described below.

In the embodiment shown in FIG. 1, suspension system 10 also includes a microcomputer 30 operatively coupled to sensors 12 and configured for processing signals indicating the wheel location in accordance with the control routine to generate control signals used to control the damping levels in the adjustable damping mechanism operatively coupled to each wheel. The computer 30 is configured to determine the vertical velocity of the wheel as the wheel interacts with the road surface. In one embodiment, the vertical velocity of the wheel is determined by taking the time derivative (dy/dt) of the wheel position over a predetermined time period. In another embodiment, the vertical velocity of the wheel is determined by integrating a value provided, for example, by an accelerometer configured to measure the rate of change in velocity of the wheel in a vertical direction. Computer 30 may include a memory for storing the damping level control routine and any additional data or programs that may be required for operation of the suspension system. Computer 30 is incorporated into or operatively coupled to the suspension controller 40.

If desired, one or more known filters 32 (for example, band-pass filters) may be operatively coupled to sensors 12 for filtering noise components from the sensor signals in a known manner. In addition, a pre-processing circuit 34 may be operatively coupled to sensors 12 if needed, for converting signals received from the sensors 12 into a form suitable for processing by computer 30. If required, control signals generated by microcomputer 30 may be transmitted to a driving circuit or post-processor 36 for conversion to a form to which the adjustable damping mechanisms 18 are responsive. The driving circuit may be configured to process the received control signals into a form suitable for operating hydraulically-actuated cylinders, cylinders actuated by solenoid valves or electromagnetically energized proportional-action valves, cylinders incorporating a magneto-rheological fluid, or any other suitable types of active cylinders or shock-absorbers, for example.

A timer element 50 is also incorporated into or operatively coupled to controller 40. Timer 50 is used in the manner described below to measure the lengths of various time periods during which the vertical position of the vehicle wheel is changing as the wheel falls into a depression in the road surface.

If desired, any elements (for example, computer 30, filter 32, etc.) needed to interface between the sensors 12 and the active damping mechanisms may be incorporated into a suspension controller operatively coupled to the damping mechanisms and configured for generating control signals to the damping mechanisms. As previously described, the controller controls adjustment of the damping levels by receiving the sensor signals and generating appropriate control commands to the active damping mechanisms 18.

Figure 2:
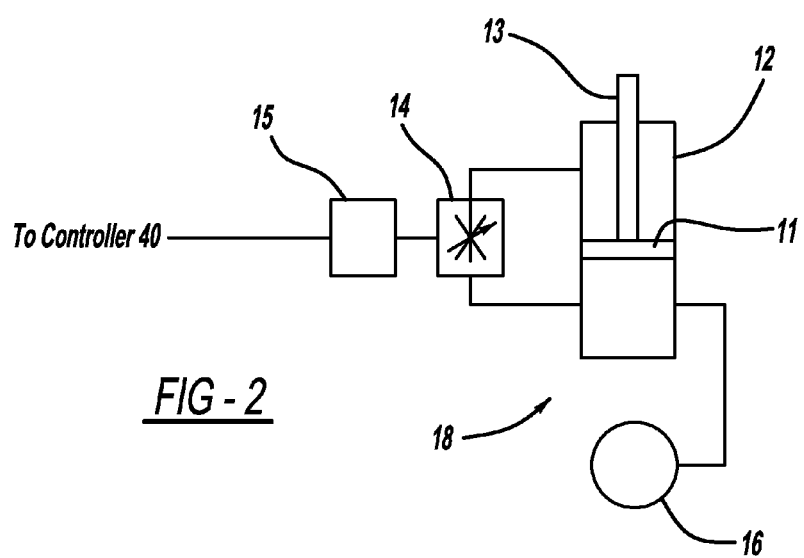
FIG. 2 is a block diagram of an exemplary adjustable damping mechanism controllable in accordance with a damping force control routine in accordance with an embodiment of the present invention.

Referring to FIGS. 1 and 2, the suspension system 10 includes an independently operable, active damping mechanism 18 operatively coupled to each vehicle wheel between an unsprung mass and a sprung mass of the vehicle. The damping mechanism 18 coupled to each wheel is operable independently of the damping mechanisms 18 coupled to the other wheels.

FIG. 2 shows one particular structure of an adjustable damping mechanism controllable by controller 40 for implementing embodiments of the damping force control routine described herein. Referring to FIGS. 1 and 2, each of damping mechanisms 18-1, 18-2, 18-3, and 18-4 includes an associated shock absorber which is provided between an unsprung mass and a sprung mass of the vehicle. Each shock absorber includes a hydraulic cylinder 12 subdivided by a piston 11 into an upper and a lower fluid chamber and supported on the unsprung mass of the vehicle. A piston rod 13 of piston 11 is carried by the sprung mass of the vehicle. The upper and lower fluid chambers of the hydraulic cylinder 12 are interconnected through a variable orifice 14. The opening size of the variable orifice 14 is controlled by operation of an associated stepping motor 15 to control the damping force of the shock absorber. In the embodiment shown in FIG. 2, at each of adjustable damping mechanisms 18, the stepping motor 15 is driven to control the size of an associated variable orifice 14 to control the damping force provided by the shock absorbers in adjustable damping mechanisms 18. Thus, in this embodiment, the driving circuit 36 drives each of the stepping motors 15 in response to control signals received from computer 30. The lower fluid chamber of the hydraulic cylinder 12 is connected to an associated gas spring unit 16 which is provided to absorb the volume change in the lower fluid chamber caused by movement of the piston rod 13.

As stated previously, instead of units utilizing stepping motors to control the damping force of the shock absorber, adjustable damping mechanisms 18 in accordance with embodiments of the present invention may include hydraulically-actuated cylinders, cylinders actuated by solenoid valves or electromagnetically energized proportional-action valves, cylinders incorporating a magneto-rheological fluid, or any other suitable types of cylinders or shock-absorbers, for example. However, each adjustable damping mechanism 18 may be of any known type controllable by the methods and components described herein to adjust the damping force applied to an associated wheel, and capable of the dynamic response required to provide the variations in damping levels described herein.

Figure 3:
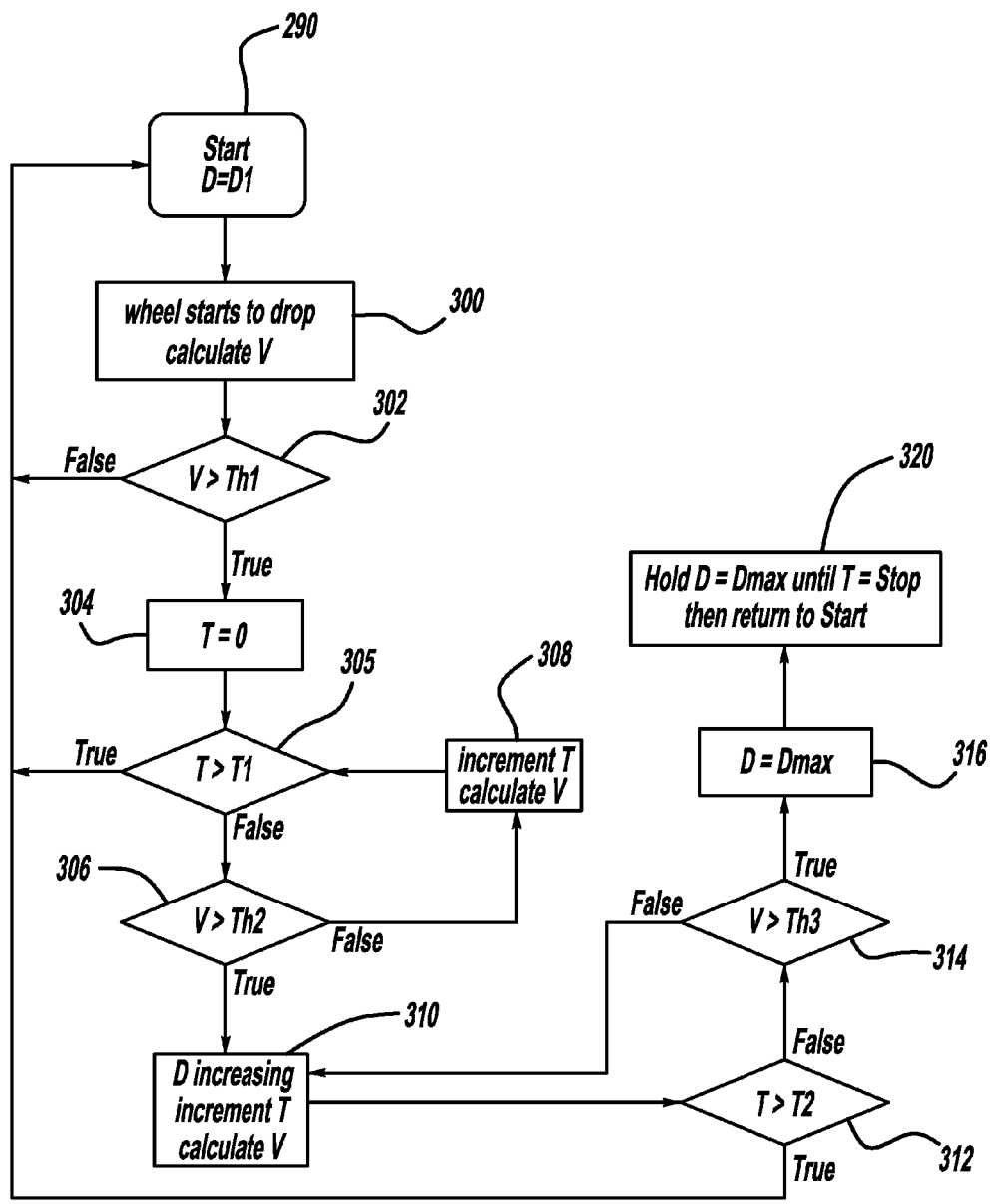
FIG. 3 is a block diagram showing a flow of a damping force control routine for controlling forces in the active damping mechanisms

In the embodiments of the present invention, the computer 30 is designed to repeatedly execute the control routine shown in the flow diagram of FIG. 3. Thus, hereinafter, control of a damping force which attenuates vertical motion of the wheel relative to the vehicle body at the right front road wheel will be described with reference to FIG. 3.

Assuming that the computer 30 has been connected to an electric power source (not shown) by operation of an ignition switch (not shown) of the vehicle, the computer 30 initializes the control program of FIG. 3 and repeats execution of processing steps 290-320 of the program.

FIG. 3 shows one embodiment of a control routine for the portion of the active suspension system controlling the damping level applied to a single wheel 20 of the vehicle. It will be understood that this same control routine may be applied independently to any of the wheels of the vehicle, responsive to the road conditions experienced by the respective wheel.

Figure 4:
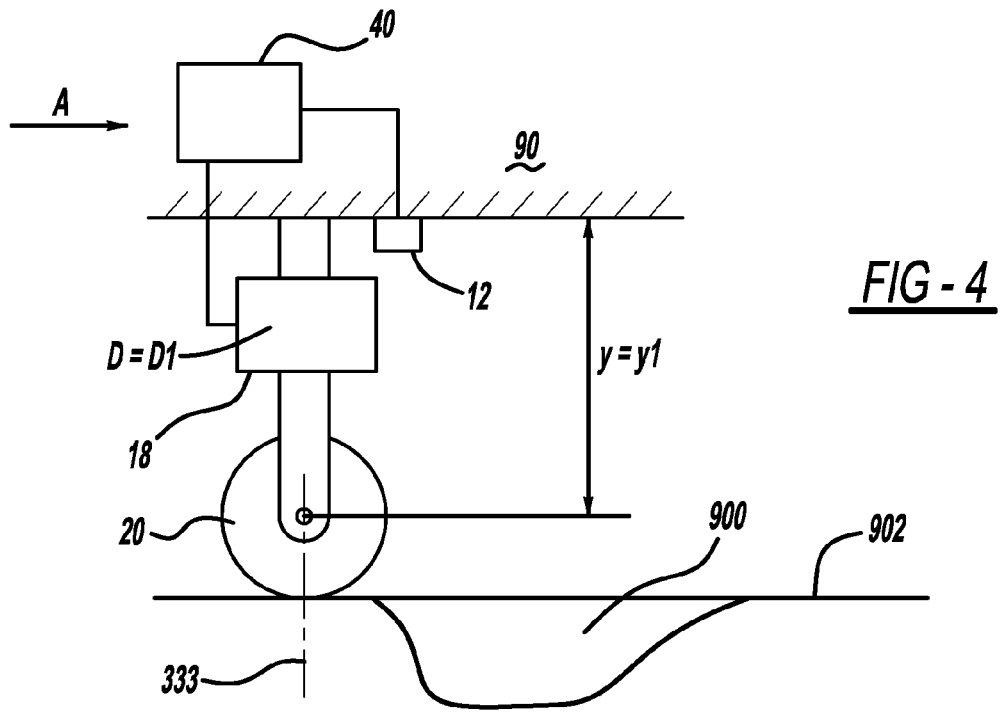
FIG. 4 is a block diagram showing a vehicle wheel moving along a road surface prior to entering a pothole or other depression in the road surface.
Figure 5:
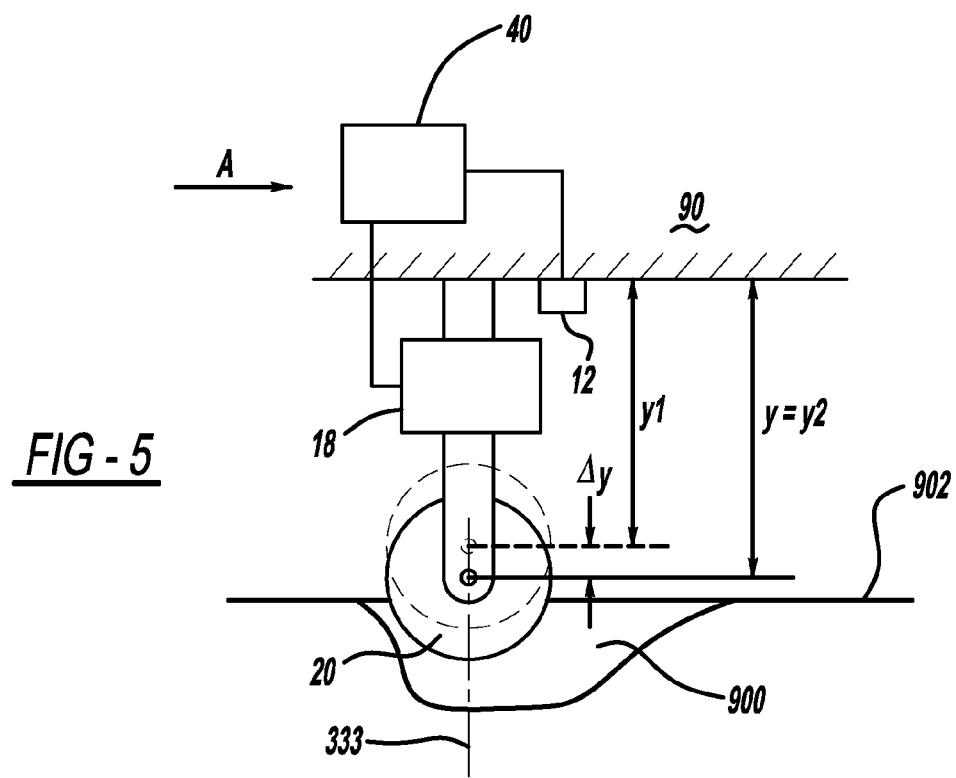
FIG. 5 is a block diagram showing a vehicle wheel moving along a road surface after entering a pothole or other depression in the road surface.

The control routine controls the damping force applied to the wheel responsive to a protocol activated when the time rate of change of the vertical position of the wheel indicates that the wheel may have encountered a pothole or other depression in the road surface. In FIGS. 4 and 5, the parameter "y" represents a current position of the wheel 20 along a vertical axis with respect to a predetermined reference location (for example, a location on the chassis 90) with respect to which the wheel is movable vertically, and parameter D represents a damping force level applied to the wheel. Arrow "A" represents the direction of vehicle travel along road surface 902.

In block 290 of the control routine, parameters y and D are at initial levels representing a state of an associated damping element 18 prior to the wheel 20 encountering a chuck hole or pothole 900. FIG. 4 also shows the wheel 20 moving along the road surface 902 prior to entering the pothole 900. Initially, the wheel 20 is traveling along a relatively smooth portion of the road 902, and the elements of the suspension system are adjusted so as to provide a damping level D having an initial (i.e., "normal") reference value of D1. The initial value of D1 may be any desired value within the controllable range of settings for the damping level D, depending on the specific characteristics and elements of the particular suspension system. In the embodiments of the present invention described herein, the initial damping level D1 is set to provide a relatively low degree of damping to the wheel motion, thereby providing a relatively "softer" suspension for enhanced ride quality. In addition, the vertical position y1 of the wheel with respect to the reference location while the wheel is travelling along the smooth road surface is assigned a "0" (zero) value.

At block 300 of FIG. 3 and as shown in FIG. 5, the wheel 20 has encountered a relative depression 900 in the road 902 which may or may not be a pothole. As a result of the depression 900, road support is removed from the wheel 20 and the wheel begins to drop into the depression. Position sensor 12 operatively coupled to the wheel continuously senses the vertical wheel position "y" as the wheel drops into the depression and conveys this position to computer 30.

In the manner previously described, after passage of a predetermined time interval $\Delta t$, the new, lower position of the wheel is assigned to the variable y2 by the computer. The computer 30 then calculates the absolute value of the time rate of change in position $\Delta y_1 = y2 - y1$ of the wheel over the predetermined time interval $\Delta t$ (i.e., the computer calculates the time derivative of position coordinate y, which is (dy/dt). This calculated time rate of change in wheel position is assigned to the variable V, and represents the instantaneous velocity of the wheel in the vertical direction at time $\Delta t$ and in wheel position y2. For purposes of adjusting the damping forces applied to the wheel, the contemplated range of values of $\Delta t$ includes values less than 10 milliseconds. In one particular embodiment, the value of $\Delta t$ is 2 milliseconds. The range of values of $\Delta t$ depends on type of suspension design and components used and other pertinent factors. However, the value of $\Delta t$ may be set at any desired value, depending on the requirements of a particular application. As stated previously, the predetermined value of $\Delta t$ may be stored, for example, in a look-up table in computer memory. In general, for purposes of adjusting the damping forces applied to the wheel, it is desirable that the time interval $\Delta t$ be as short as possible so that a rapid determination can be made regarding whether the threshold value Th1 has been exceeded and further, rapid successive measurements of the wheel position y are required.

In block 302, the calculated value of the instantaneous velocity V is compared to a first predetermined velocity threshold value Th1. If V is less than Th1, a "false" condition is recognized and the process returns to block 290 (i.e., the damping level D is maintained at the initial reference value of D1). This damping level is maintained until the wheel encounters a depression in the road. However, if V is equal to or exceeds Th1, a "true" condition is recognized. The fact that the instantaneous velocity V met or exceeded the threshold value Th1 is taken as an indication that the wheel is potentially beginning to fall into a depression 900. The satisfaction of this condition is interpreted as confirmation that the wheel has encountered a potential pothole condition and, following this confirmation, the "y" position of the wheel is measured at very short intervals of time to monitor the continued drop (if any) of the wheel into the depression. The occurrence of a "true" condition indicates that the change in wheel position ($\Delta y$) over the elapsed time $\Delta t$ (i.e., the speed of the vertical component of motion of the wheel into the depression) as just measured is sufficient to warrant initialization and activation of timer 50 to measure the time elapsed during any further changes in wheel position. In this case, the process goes to block 304.

The predetermined velocity threshold values used by the control routine as described herein may be stored, for example, in a look-up table in computer memory. The predetermined velocity threshold values may be calculated and/or iteratively determined by experimentation for each configuration of a wheel and an associated active suspension system, and then saved in the computer memory. The predetermined velocity threshold values are selected with a view to minimizing the deleterious effects on ride and maximizing the probability of detecting an actual pothole event as soon as possible upon its occurrence. Values typically range between 0.2 meters/second and 5 meters/second. Factors affecting the range of values include suspension tuning, vehicle speed, vehicle tire characteristics, and other factors. The ranges of values for the various velocity thresholds may be based on data collected from both potholes and non-pothole ride events. The use of such data to program or "tune" the suspension system facilitates rapid detection of actual potholes, while helping to minimize negative effects on ride due to increases in damping prompted by "false positive" detections of pothole events.

At block 304, once it has been determined that the wheel may have encountered a pothole event, the timer is set to an initial value of T=0, and then allowed to increment.

The loop or subroutine formed by blocks 305, 306 and 308 is directed to comparing the instantaneous velocity V of the wheel at successive points in time to another predetermined threshold velocity value Th2 until either (1) the timer value T exceeds a predetermined first time threshold T1, or (2) the instantaneous velocity V of the wheel exceeds the predetermined velocity threshold value Th2. As before, the instantaneous velocities V at the successive points in time are calculated by taking the time derivative of the vertical position y of the wheel (dy/dt) where dt is the time elapsed between any two the successive points in time at which the wheel location y is measured and dy is the additional vertical distance the wheel has fallen during the time dt. In the embodiments described herein, the range of values for T1 is 0.001 to 0.100 milliseconds. Generally, the time threshold T1 is longer than the value of $\Delta t$. The length of T1 should be sufficient to enable differentiation of an actual pothole event from sensor noise, based on passage of the velocity threshold within the time threshold T1. The ranges of values e time threshold T1 may be based on data collected from both potholes and non-pothole ride events. The use of such data to program or "tune" the suspension system facilitates rapid detection of actual potholes, while helping to minimize negative effects on ride due to increases in damping prompted by "false positive" detections of pothole events.

At block 305, the timer reading T since initialization is compared with the first predetermined time threshold T1. If the timer reading T is greater than the value of T1 (i.e., if the time elapsed since the re-initialization of the timer is greater than T1), a "true" condition is recognized and the damping level D is maintained at the reference value D1. If the time elapsed since the re-initialization of the timer is less than T1, a "false" condition is recognized and the process proceeds to block 306, where the instantaneous velocity V=$\Delta y$/T (i.e., dy/dt) of the wheel is again calculated.

In block 306, the new calculated value of the instantaneous wheel velocity V is compared to a second predetermined threshold value Th2. If the new wheel velocity V exceeds Th2, a "true" condition is recognized and it is determined that the change in wheel position ($\Delta y$) over the elapsed time T (i.e., the new instantaneous velocity of the wheel into the depression) is sufficient to warrant an increase in damping level D. Thus, the process proceeds to block 310. However, if the instantaneous wheel velocity V is equal to or less than Th2, a "false" condition is recognized and the process proceeds to block 308 where the instantaneous wheel velocity V is re-calculated after passage of an additional predetermined time interval $\Delta t$ (i.e., after T has been incremented by $\Delta t$). The process then proceeds back to block 305 to determine if the total time T elapsed since initialization of the timer is greater than time threshold T1. If T is greater than T1, the control routing proceeds back to block 290.

In the manner described above, the loop 305-306-308 repeats as long as the timer value T does not exceed the threshold T1, and as long as the instantaneous wheel velocity V does not exceed the velocity threshold Th2. If the timer value T exceeds the first timer threshold T1 without the wheel velocity V exceeding the velocity threshold VTh2, a "false" condition is recognized and it is determined that the wheel has not moved or has not moved with sufficient velocity during passage of the time period T1 to warrant an increase in the damping level D. The damping level is thus returned to the initial reference value D1. However, if the wheel velocity V in block 306 exceeds the velocity threshold Th2 before the timer value T exceeds first timer threshold T1, a "true" condition is recognized and the process proceeds to block 310, where the damping level D is increased by a predetermined amount ΔD to a higher value of D2. Stated another way, after the passage of every time interval Δt, the instantaneous wheel velocity V is re-calculated and both the timer reading T and the instantaneous wheel velocity V are compared to respective threshold values to determine whether the damping level D is to be modified. Incremental increases in the damping level are implemented as a "ramp" or "slope" extending between the initial and new damping levels. If the instantaneous wheel velocity V exceeds threshold Th2 within the time period defined by T1, a "true" condition is recognized and the damping level is increased in block 310. However, if the instantaneous wheel velocity V remains equal to or below the first threshold Th2 within the time period defined by T1, the damping level D is thus returned to the initial reference value D1.

The loop formed by blocks 310, 312 and 314 is directed to incrementally increasing the damping level by a predetermined amount after the passage of every time interval Δt until either (1) the timer reading T after initialization exceeds a second timer threshold T2, or (2) the instantaneous wheel velocity V exceeds a third velocity threshold Th3.

Instances where the wheel continues to exceed the velocity thresholds within the associated time intervals indicate a lack of road support for the wheel to a depth sufficient to cause the wheel to continue to drop in the "y" direction.

The amounts by which the damping level D is incremented during execution of the control routine described herein may be constant for each step, or the amounts may be determined according to the requirements of a particular application. The amounts by which the damping level D is incremented may be determined according to the requirements of a particular suspension system design, the range of damping settings available in a particular type of damping, the method used to actuate the damping, and other pertinent factors. In addition, the number of steps or increments into which the range of damping levels may be divided to facilitate the incremental increases in damping levels may be determined according to the requirements of a particular application.

In block 310, the damping level is increased by a predetermined amount ΔD to level D2. The instantaneous wheel velocity V is re-calculated after the passage of another time interval after timer value T has been incremented another Δt from its value as used in the previous instantaneous velocity calculation).

In block 312, the timer reading T is compared with a second predetermined time threshold T2. If the timer reading T is greater than the value of T2 (i.e., if the time elapsed since the initialization of the timer in block 304 is greater than T2), a "true" condition is recognized and the damping level D is returned to the reference value D1. However, if the time elapsed since the initialization of the timer is less than T2, a "false" condition is recognized and the process proceeds to block 314.

In block 314, if the instantaneous wheel velocity V is equal to or less than threshold Th3, a "false" condition is recognized and the process proceeds back to block 310 where the damping level is again increased by a predetermined amount ΔD and the instantaneous wheel velocity V is re-calculated after passage of an additional predetermined time interval Δt. The process then proceeds back to block 312 to determine if the elapsed time T is greater than time threshold T2.

In the manner described above, the loop 310-312-314 repeats as long as the timer value T does not exceed the second timer threshold T2, and as long as the instantaneous wheel velocity V does not exceed the third velocity threshold Th3. If the timer value T (measured since initialization) exceeds the second timer threshold T2 without the wheel velocity V exceeding the velocity threshold Th3, a "false" condition is recognized and it is determined that the wheel has not moved further or has not moved with sufficient velocity during passage of the time period T2 to warrant a further increase in the damping level. The damping level is thus returned to the initial reference value D1.

However, if the wheel velocity V exceeds threshold Th3 prior to the timer value T exceeding the second timer threshold T2, a "true" condition is recognized and it is determined that the change in wheel position (Δy) over the elapsed time T (i.e., the speed of the vertical motion of the wheel into the depression) is sufficient to warrant a further increase in damping level D to the maximum tuned damping level, $D_{MAX}$ in block 316.

While the process proceeds through the loop defined by blocks 310-312-314, the damping level continues to be incremented gradually, in stepwise manner so that, if and when the maximum damping level $D_{MAX}$ is required, the increase in damping level from the current damping level to $D_{MAX}$ will be smaller than the increase in damping level from D1 to $D_{MAX}$. This aids in minimizing or eliminating the "knocking" or "thumping" effect which may be caused by a sudden, large shift in hydraulic pressure needed to progress from $D_1$ to $D_{MAX}$ in a relatively shorter time period, and which may be discernible by passengers of the vehicle. The process described herein also enables the system damping force to be increased incrementally between a first predetermined value to a next, higher predetermined value. Thus, when it is determined that the next, higher predetermined value is required, the size of the remaining increase required to reach the next, higher predetermined value is smaller than the size of the gap between the first predetermined value and the highest predetermined value.

In block 320, the damping level is maintained at $D=D_{MAX}$ until the elapsed time as indicated by the timer value T reaches a predetermined stop point $T_{STOP}$. The damping level is then returned to the initial reference value D1.

By incrementally increasing the damping forces exerted by the damping responsive to the continued drop of the wheel into the road depression, the embodiments of the control routine described herein helps to minimize the amount of the damping force increase and delays implementation of the force increase for as long as possible, thereby preserving the relatively higher ride quality provided by the lower damping level for as long as possible.

Using the embodiments of the control routine described herein, implementation of the damping force increase to $D_{MAX}$ (which has the greatest deleterious effect on ride quality) is ideally restricted to cases where it is most desired (i.e., cases where the wheel encounters a relatively deep pothole or depression). This increase in damping level limits the depth to which the wheel drops into the depression and aids in minimizing the jarring impact caused by the wheel striking the opposite side of the pothole as it rises out of the hole.

A control routine in accordance with an embodiment of the present invention may be incorporated as a subroutine into a broader new or existing control routine designed control to additional elements of the suspension system as well as the active damping mechanism, and/or which controls elements of the active suspension system based on inputs from both the wheel position sensors and other types of sensors.

As described above, a control routine in accordance with an embodiment of the present invention enables efficient operation of vehicle suspension systems incorporating continuously variable or multistep suspension dampers, so as to maximize ride quality and reduce loading on the suspension system.

As described herein, in one embodiment of the invention includes an active vehicle suspension system having an active damping mechanism operatively coupled to a vehicle wheel and configured for controlling a damping force applied to the wheel responsive to a control signal. A controller is operatively coupled to the damping mechanism and configured for generating a control signal to the damping mechanism responsive to a velocity of the wheel in a downward vertical direction.

Also as described herein, another embodiment of the invention provides a method for controlling a damping level applied to a wheel in an active suspension system. The method includes the steps of determining a velocity defined as a rate of change of a vertical position of the wheel over a first predetermined time period; comparing the velocity to a velocity threshold; and where the velocity is greater than the velocity threshold, increasing the damping level.

Also as described herein, another embodiment of the invention provides a method for applying a damping force to a wheel moving in a downward vertical direction. The method includes the steps of measuring a time during which the wheel moves in the direction; measuring a velocity of the wheel in the direction; comparing the time to a threshold and the velocity to another threshold; and where the time does not exceed the threshold and the velocity exceeds the other threshold, applying a maximum available damping force to the wheel.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A vehicle suspension control method comprising:
by a controller operatively coupled to a vehicle suspension for a wheel:
repeatedly calculating a vertical velocity of the wheel until the vertical velocity exceeds a first velocity threshold, a time between each calculation of the vertical velocity being equal to a first time interval;
in response to the vertical velocity exceeding the first velocity threshold, initiating a timer and maintaining a damping level of the vehicle suspension at an initial value while repeatedly recalculating the vertical velocity of the wheel until the recalculated vertical velocity exceeds a second velocity threshold, a time between each recalculation of the vertical velocity being equal to a second time interval, the second time interval being less than the first time interval; and
in response to the recalculated vertical velocity exceeding the second velocity threshold before the timer exceeds a first time threshold, adjusting the vehicle suspension to increase the damping level of the suspension.

2. The method of claim 1, wherein the first time threshold is between 0.001 ms and 0.1 ms, and the second time interval is less than the first time threshold.

3. The method of claim 1, wherein the first time interval is less than 10 ms.

4. The method of claim 3, wherein the first time interval is 2 ms.

5. The method of claim 1, wherein the adjusting the vehicle suspension to increase the damping level comprises repeatedly increasing the damping level of the suspension by an incremental amount, a time between each increase of the damping level being equal to a third time interval.

6. The method of claim 5, further comprising, recalculating the vertical velocity with each increase of the damping level of the suspension by the incremental amount, wherein the repeatedly increasing the damping level is performed until the recalculated vertical velocity exceeds a third velocity threshold or the timer exceeds a second time threshold greater than the first time threshold.

7. The method of claim 6, wherein the adjusting the vehicle suspension to increase the damping level comprises, in response to the recalculated vertical velocity exceeding the third velocity threshold, adjusting the vehicle suspension to increase the damping to a maximum level.

8. The method of claim 7, further comprising:
in response to the timer exceeding a third time threshold greater than the second time threshold, adjusting the vehicle suspension to revert to the initial value of damping.

9. The method of claim 6, further comprising:
in response to the recalculated vertical velocity being less than the third velocity threshold and the timer exceeding the second time threshold, adjusting the vehicle suspension to revert to the initial value of damping.

10. The method of claim 1, further comprising:
in response to the recalculated vertical velocity being less than the second velocity threshold and the timer exceeding the first time threshold, maintaining the vehicle suspension with the initial value of damping.

11. The method of claim 1, wherein the vertical velocities are calculated by taking time derivatives of respective vertical positions of the wheel, said vertical positions being measured by one or more sensors.

12. A vehicle suspension control method comprising:
by a controller operatively coupled to an adjustable damping mechanism of a vehicle suspension for a wheel:
sampling, at a first frequency, a vertical velocity of the wheel until the vertical velocity exceeds a first velocity threshold;
when the vertical velocity exceeds the first velocity threshold, initiating a timer, and controlling the adjustable damping mechanism to maintain a damping of the vehicle suspension at an initial level while sampling, at a second frequency, the vertical velocity of the wheel until the vertical velocity exceeds a second velocity threshold, the second frequency being greater than the first frequency; and
when the vertical velocity exceeds the second velocity threshold before the timer exceeds a first time threshold, sending an adjustment signal to the adjustable damping mechanism to increase the damping level of the vehicle suspension.

13. The method of claim 12, wherein the first time threshold is between 0.001 ms and 0.1 ms.

14. The method of claim 12, wherein the first frequency corresponds to a time interval of less than 10 ms.

15. The method of claim 12, wherein the sampling the vertical velocity comprises receiving signals indicative of vertical positions of the wheel and calculating a corresponding vertical velocity based on the signals.

16. The method of claim 12, wherein the sending an adjustment signal to the adjustable damping mechanism to increase the damping level comprises repeatedly sending the adjustment signal to increase the damping level by an incremental amount, a time between each sending of the adjustment signal being equal to a third time interval.

17. The method of claim 16, further comprising, sampling the vertical velocity at a third frequency corresponding to the third time interval.

18. The method of claim 17, wherein the repeatedly sending the adjustment signal is performed until the vertical velocity exceeds a third velocity threshold or the timer exceeds a second time threshold greater than the first time threshold.

19. The method of claim 18, further comprising:
in response to the vertical velocity being less than the third velocity threshold and the timer exceeding the second time threshold, sending a signal to the adjustable damping mechanism that causes the adjustable damping mechanism to adjust the damping level to the initial value of damping for the vehicle suspension.

20. The method of claim 18, further comprising:
in response to the vertical velocity exceeding the third velocity threshold, sending a signal to the adjustable damping mechanism that causes the adjustable damping mechanism to provide a maximum damping level for the vehicle suspension.

21. The method of claim 20, further comprising:
in response to the timer exceeding a third time threshold greater than the second time threshold, sending a signal to the adjustable damping mechanism that causes the adjustable damping mechanism to adjust the damping level to the initial value of damping for the vehicle suspension.

22. The method of claim 12, wherein the adjustable damping mechanism comprises a variable orifice, and wherein the sending the adjustment signal includes signaling a change in a size of the variable orifice to provide a corresponding change in damping level for the vehicle suspension.

23. The method of claim 22, wherein the sending the adjustment signal to the adjustable damping mechanism comprises using a stepper motor to alter the size of the variable orifice.

24. The method of claim 12, wherein the sending an adjustment signal to the adjustable damping mechanism to increase the damping for the vehicle suspension causes a change in a physical aspect of the damping mechanism to provide a corresponding change in damping level for the vehicle suspension.

25. The method of claim 12, wherein the adjustable damping mechanism comprises one of a hydraulically actuated cylinder, a cylinder actuated by a solenoid valve, an electromagnetically energized proportional-action valve, or a magneto-rheological fluid, and the adjustment signal causes a change in a physical aspect of the adjustable damping mechanism to provide a corresponding change in damping level for the vehicle suspension.

26. The method of claim 12, further comprising:
in response to the vertical velocity being less than the second velocity threshold and the timer exceeding the first time threshold, controlling the adjustable damping mechanism to maintain the initial value of damping for the vehicle suspension.

27. A vehicle suspension system comprising:
an active damping mechanism operatively coupled to a vehicle wheel and configured to control damping applied to the wheel; and
a controller operatively coupled to the active damping mechanism, the controller being configured to:
repeatedly calculate a vertical velocity of the wheel until the vertical velocity exceeds a velocity threshold, a time between each calculation of the vertical velocity being equal to a first time interval;
in response to the vertical velocity exceeding the first velocity threshold, initiate a timer and maintain a damping level of the active damping mechanism at an initial value of damping while repeatedly recalculating the vertical velocity of the wheel until the recalculated vertical velocity exceeds a second velocity threshold, a time between each recalculation of the vertical velocity being equal to a second time interval, the second time interval being less than the first time interval; and
in response to the recalculated vertical velocity exceeding the second velocity threshold before the timer exceeds a first time threshold, adjust the active damping mechanism to increase the damping level applied to the wheel.

28. The system of claim 27, wherein the first time threshold is between 0.001 ms and 0.1 ms, and the second time interval is less than the first time threshold.

29. The system of claim 27, wherein the first time interval is less than 10 ms.

30. The system of claim 29, wherein the first time interval is 2 ms.

31. The system of claim 27, wherein the controller is configured to adjust the active damping mechanism to increase the damping level by repeatedly increasing the damping level by an incremental amount, a time between each increase of the damping level being equal to a third time interval.

32. The system of claim 31, wherein the controller is configured to:
recalculate the vertical velocity with each increase of the damping level by the incremental amount; and
adjust the active damping mechanism to repeatedly increase the damping by the incremental amount until the recalculated vertical velocity exceeds a third velocity threshold or the timer exceeds a second time threshold greater than said first time threshold.

33. The system of claim 32, wherein the controller is further configured to:
in response to the recalculated vertical velocity exceeding the third velocity threshold, adjust the active damping mechanism to increase the damping to a maximum level.

34. The system of claim 33, wherein the controller is further configured to:
in response to the timer exceeding a third time threshold greater than the second time threshold, adjust the active damping mechanism to revert to the initial value of damping.

35. The system of claim 32, wherein the controller is further configured to:
in response to the recalculated vertical velocity being less than the third velocity threshold and the timer exceeding the second time threshold, adjust the active damping mechanism to revert to the initial value of damping.

36. The system of claim 27, wherein the controller is further configured to:
in response to the recalculated vertical velocity being less than the second velocity threshold and the timer exceeding the first time threshold, control the active damping mechanism to maintain the initial value of damping.

37. The system of claim 27, further comprising one or more sensors that measure a vertical position of said wheel, wherein the controller is configured to calculate the vertical velocities by taking time derivatives of respective vertical position measurements from the one or more sensors.

38. The system of claim 27, wherein the active damping mechanism comprises a variable orifice, a size of the variable orifice corresponds to a value of damping provided by the active damping mechanism, and the controller is configured to control the size of the variable orifice.

39. The system of claim 27, wherein the active damping mechanism comprises at least one of a variable orifice, a hydraulically actuated cylinder, a cylinder actuated by a solenoid valve, an electromagnetically energized proportional-action valve, and a magneto-rheological fluid.

40. A vehicle suspension system comprising:
an active damping mechanism operatively coupled to a vehicle wheel and configured to control damping applied to the wheel; and
a controller operatively coupled to the active damping mechanism, the controller being configured to:
sample, at a first frequency, a vertical velocity of the wheel until the sampled vertical velocity exceeds a first velocity threshold;
when the sampled vertical velocity exceeds the first velocity threshold, initiate a timer, and control the active damping mechanism to maintain the damping applied to the wheel at an initial level while sampling, at a second frequency, the vertical velocity of the wheel until the vertical velocity exceeds a second velocity threshold, the second frequency being greater than the first frequency; and
when the vertical velocity exceeds the second velocity threshold before the timer exceeds a first time threshold, control the active damping mechanism to increase the damping level applied to the wheel.

41. The system of claim 40, wherein the first time threshold is between 0.001 ms and 0.1 ms.

42. The system of claim 40, wherein the first frequency corresponds to a time interval of less than 10 ms.

43. The system of claim 40, wherein the controller is configured to control the active damping mechanism to increase the damping level by repeatedly increasing the damping level by an incremental amount, a time between each increase of the damping level being equal to a third time interval.

44. The system of claim 43, wherein the controller is configured to:
sample the vertical velocity at a third frequency corresponding to the third time interval; and
control the active damping mechanism to repeatedly increase the damping by the incremental amount until the vertical velocity exceeds a third velocity threshold or the timer exceeds a second time threshold greater than said first time threshold.

45. The system of claim 44, wherein the controller is further configured to:
in response to the vertical velocity exceeding the third velocity threshold, control the active damping mechanism to increase the damping to a maximum level.

46. The system of claim 45, wherein the controller is further configured to:
in response to the timer exceeding a third time threshold greater than the second time threshold, control the active damping mechanism to revert to the initial level of damping.

47. The system of claim 44, wherein the controller is further configured to:
in response to the vertical velocity being less than the third velocity threshold and the timer exceeding the second time threshold, control the active damping mechanism to revert to the initial level of damping.

48. The system of claim 40, wherein the controller is further configured to:
in response to the vertical velocity being less than the second velocity threshold and the timer exceeding the first time threshold, control the active damping mechanism to maintain the initial level of damping.

49. The system of claim 40, further comprising one or more sensors that measure a vertical position of said wheel, wherein the controller is configured to sample the vertical velocity by receiving signals from said one or more sensors indicative of vertical positions of the wheel and calculating corresponding vertical velocities based on the signals.

50. The system of claim 40, wherein the active damping mechanism comprises at least one of a variable orifice, a hydraulically actuated cylinder, a cylinder actuated by a solenoid valve, an electromagnetically energized proportional-action valve, and a magneto-rheological fluid.

* * * * *